United States Patent
Yoshizawa et al.

(10) Patent No.: US 7,045,181 B2
(45) Date of Patent: May 16, 2006

(54) DOUBLE GLAZING

(75) Inventors: Hideo Yoshizawa, Osaka (JP); Hiroaki Kato, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 72 days.

(21) Appl. No.: 10/494,499

(22) PCT Filed: Dec. 9, 2002

(86) PCT No.: PCT/JP02/12878

§ 371 (c)(1),
(2), (4) Date: May 3, 2004

(87) PCT Pub. No.: WO03/055819

PCT Pub. Date: Jul. 10, 2003

(65) Prior Publication Data

US 2004/0265518 A1    Dec. 30, 2004

(30) Foreign Application Priority Data

Dec. 25, 2001   (JP)   ............................. 2001-391998

(51) Int. Cl.
  *E06B 3/24*   (2006.01)
  *E06B 3/26*   (2006.01)
  *E06B 3/28*   (2006.01)
  *E04C 2/54*   (2006.01)

(52) U.S. Cl. ....................... 428/34; 52/786.1
(58) Field of Classification Search .............. 428/34, 428/63; 52/786.1
See application file for complete search history.

(56) References Cited

U.S. PATENT DOCUMENTS

| 5,657,607 A | * | 8/1997 | Collins et al. | ........... 52/786.13 |
| 6,261,652 B1 | * | 7/2001 | Poix et al. | ..................... 428/34 |

FOREIGN PATENT DOCUMENTS

| JP | 2000-203892 | * | 7/2000 |
| JP | 2001-64042 A | | 3/2001 |
| JP | 2002-12455 A | | 1/2002 |
| WO | WO 00/41979 A1 | | 7/2000 |

* cited by examiner

*Primary Examiner*—Donald J. Loney
(74) *Attorney, Agent, or Firm*—Fulbright & Jaworski LLP

(57) ABSTRACT

A glass panel comprising a pair of glass plates opposed to each other with a void defined therebetween, a joining seal member for joining and sealing the glass plates at peripheries thereof, a communicating bore formed in one of the glass plates for communicating with the void and a lid member adhered to the bored glass plate having the communicating bore by a thermally meltable seal member to seal the communicating bore. The lid member is made of a material having a thermal expansion coefficient smaller than a thermal expansion coefficient of the bored glass plate. The glass panel is capable of restraining cracks and breaks from generating in the bored glass plate when the lid member is adhered to the bored glass plate by the thermally meltable seal member.

4 Claims, 3 Drawing Sheets

$\alpha < \beta < \gamma$ (a) high temperature (b) room temperature (a) high temperature (b) room temperature

DOUBLE GLAZING

This is a §371 of PCT/JP03/12878 filed Dec. 9, 2002, which claims priority from Japanese 2001-391998 filed Dec. 25, 2001, each of which are hereby incorporated by reference in their entireties.

TECHNICAL FIELD

The present invention relates to a glass panel comprising a pair of glass plates opposed to each other and defining a void therebetween, a joining seal member for joining and sealing the glass plates at peripheries thereof, a communicating bore formed in one of the glass plates to communicate with the void, and a lid member adhered to the bored glass plate having the communicating bore by a thermally meltable seal member thereby to seal the communicating bore.

BACKGROUND ART

In this type of glass panel, the thermally meltable seal member is melted by heating and is subsequently hardened by cooling, thereby to adhere the lid member placed on the thermally meltable seal member to the bored glass plate to seal the communicating bore. Conventionally, no special consideration has been made as to the thermal expansion of the bored glass plate and the lid member.

Thus, as shown in FIG. 5, where low temperature-melting glass which is meltable at 400° C. or above is used as the thermally meltable seal member 7, the low temperature-melting glass needs to be heated to 400° C. or above. The lid member 6 placed over the low temperature-melting glass is also heated as a whole to nearly 400° C. and thermally expands relative to a room temperature position indicated by T by an amount corresponding to the heating temperature as shown in (a).

With the bored glass plate 1, however, only the vicinity of the communicating bore 5 is locally heated to nearly 400° C., and peripheral portions remote from the communicating bore 5 are heated only to a lower temperature, e.g. no more than approximately 180° C. As a result, the vicinity of the communicating bore 5 is restrained from thermally expanding by the peripheral portions and is unable to thermally expand by an amount corresponding to the temperature of 400° C. Thus, an amount of thermal expansion of the vicinity of the bore becomes smaller than the amount of thermal expansion of the lid member 6.

When the thermally meltable seal member 7 is cooled in this condition to harden at approximately 380° C., for example, and adhere the lid member 6 to the bored glass plate 1, the lid member 6 and the bored glass plate 1 restrain each other from thermally contracting. When further cooled to room temperature while restraining each other from thermally contracting, the thermal construction of the lid member 6 is suppressed by the bored glass plate 1 and the lid member 6 is unable to contract to the position T as shown in (b). As a result of the suppression of the thermal contraction by an amount indicated at t2, a tensile stress W2 corresponding to t2 is produced adjacent surfaces of the bored glass plate 1 where the thermally meltable seal member 7 is adhered.

However, a glass plate has a property of being relatively strong against compressive stress but relatively vulnerable to tensile stress. Thus, the bored glass plate 1 where the tensile stress W2 is produced may suffer cracks and breaks adjacent portions where the lid member 6 is adhered. The present invention has been made having regard to the conventional problems described above, and its object is to provide a glass panel capable of restraining cracks and breaks from generating in a bored glass plate when a lid member is adhered to the bored glass plate by a thermally meltable seal member.

DISCLOSURE OF THE INVENTION (Construction)

As shown in FIGS. 1 through 4, the present invention is characterized by a glass panel P comprising a pair of glass plates 1 and 2 opposed to each other with a void V defined therebetween, a joining seal member 4 far joining and sealing the glass plates 1 and 2 at periphorics thereof a communicating bore 5 formed in one of the glass plates 1 and 2 for communicating with the void V, and a lid member 6 adhered to the bored glass plate 1 having the communicating bore 5 by a thermally meltable seal member 7 to seal the communicating bore 5, wherein the lid member 6 is made of a material having a thermal expansion coefficient $\alpha$ smaller than a thermal expansion coefficient $\gamma$ of the bored glass plate 1.

As shown in FIGS. 1 through 4, the present invention defined in Claim 2 is characterized in that the thermally meltable seal member 7 is made of a material having a thermal expansion coefficient $\beta$ smaller than the thermal expansion coefficient $\gamma$ of the bored glass plate 1 and greater than the thermal expansion coefficient $\alpha$ of the lid member 6.

As shown in FIGS. 1 through 4, the present invention defined in Claim 3 is characterized in that the lid member 6 is made of glass, and the thermally meltable seal member 7 is made of low temperature-melting glass.

As shown in FIG. 1 through 4, the present invention defined in Claim 4 is characterized in that the void V is decompressed.

While the above description includes reference numbers and symbols for expediency of comparison to the drawings, such inclusion does not limit the present invention to the constructions shown in the accompanying drawings.

(Function and Effect)

According to the characteristic feature of the present invention defined in Claim 1, the lid member for sealing the communicating bore formed in the bored glass plate by being adhered thereto through the thermally meltable seal member is made of the material having the thermal expansion coefficient smaller than the bored glass plate. Thus, as the thermally meltable seal member is heated to a melting temperature for adhering the lid member, the thermal expansion of the lid member is relatively restricted to a small amount compared with that of the bored glass plate. On the other hand, the vicinity of the communicating bore of the bored glass plate is restrained from thermally expanding by the peripheral portions thereof as noted above, and thus has a small amount of thermal expansion compared with an inherent amount of thermal expansion thereof.

Thus, even when the lid member is adhered to the bored glass plate by cooling of the thermally meltable seal member in this condition and further cooled to room temperature with the lid member and bored glass plate being restrained from thermally contracting with each other, amounts of thermal contraction of the lid member and the vicinity of the communicating bore are relatively approximate to each other. As a result, tensile stress generated in the bored glass plate is relatively small, which can effectively restrain cracks and breaks from generating in portions of the bored glass plate where the lid member is adhered.

According to the characteristic feature of the present invention, the thermally meltable seal member is made of a material having a thermal expansion coefficient smaller than that of the bored glass plate and greater than that of the lid member. In other words, the thermal expansion coefficient of the thermally meltable seal member falls between the thermal expansion coefficient of the bored glass plate and the thermal expansion coefficient of the lid member. Thus, when the thermally meltable seal member is heated to the melting temperature, an amount of thermal expansion of the thermally meltable seal member falls between the amount of thermal expansion of the lid member and the amount of thermal expansion of the bored glass plate.

Thus, when the lid member is adhered to the bored glass plate by cooling of the thermally meltable seal member in this condition and further cooled to room temperature with the lid member, thermally meltable seal member and bored glass plate being restrained from thermal contracting with one another, the thermally meltable seal member bears part of the tensile stress generated with thermal contraction of the lid member. Hence, the tensile stress generated in the bored glass plate is reduced by a corresponding amount, which can more effectively restrain cracks and breaks from generating in the portions of the bored glass plate where the lid member is adhered.

According to the characteristic feature of the present invention defined in Claim 3, the lid member is made of glass while the thermally meltable seal member is made of low temperature-melting glass. The lid member and the thermally meltable-seal member are made of glass in addition to the pair of glass plates constituting the glass panel. This realizes good adhesion between these three components. Further, the thermally meltable seal member has a low temperature melting point and the heating temperature for adhesion can be lowered. Thus, it is possible to reduce the tensile stress per se generated in the thermally meltable seal member and the bored glass plate with thermal contraction of the lid member, thereby to more reliably restrain cracks and breaks from generating in the bored glass plate.

According to the characteristic feature of the present invention, since the void between the glass plates is decompressed, a heat-insulation effect by decompression can be expected. Further, as noted above, it is possible to provide the glass panel having less possibility of suffering cracks and breaks and having an excellent heat-insulation effect.

BEST MODE FOR CARRYING OUT THE INVENTION

An embodiment of a vacuum double glazing exemplifying a glass panel according to the present invention will be described hereinafter with reference to the drawings.

Figure 1:
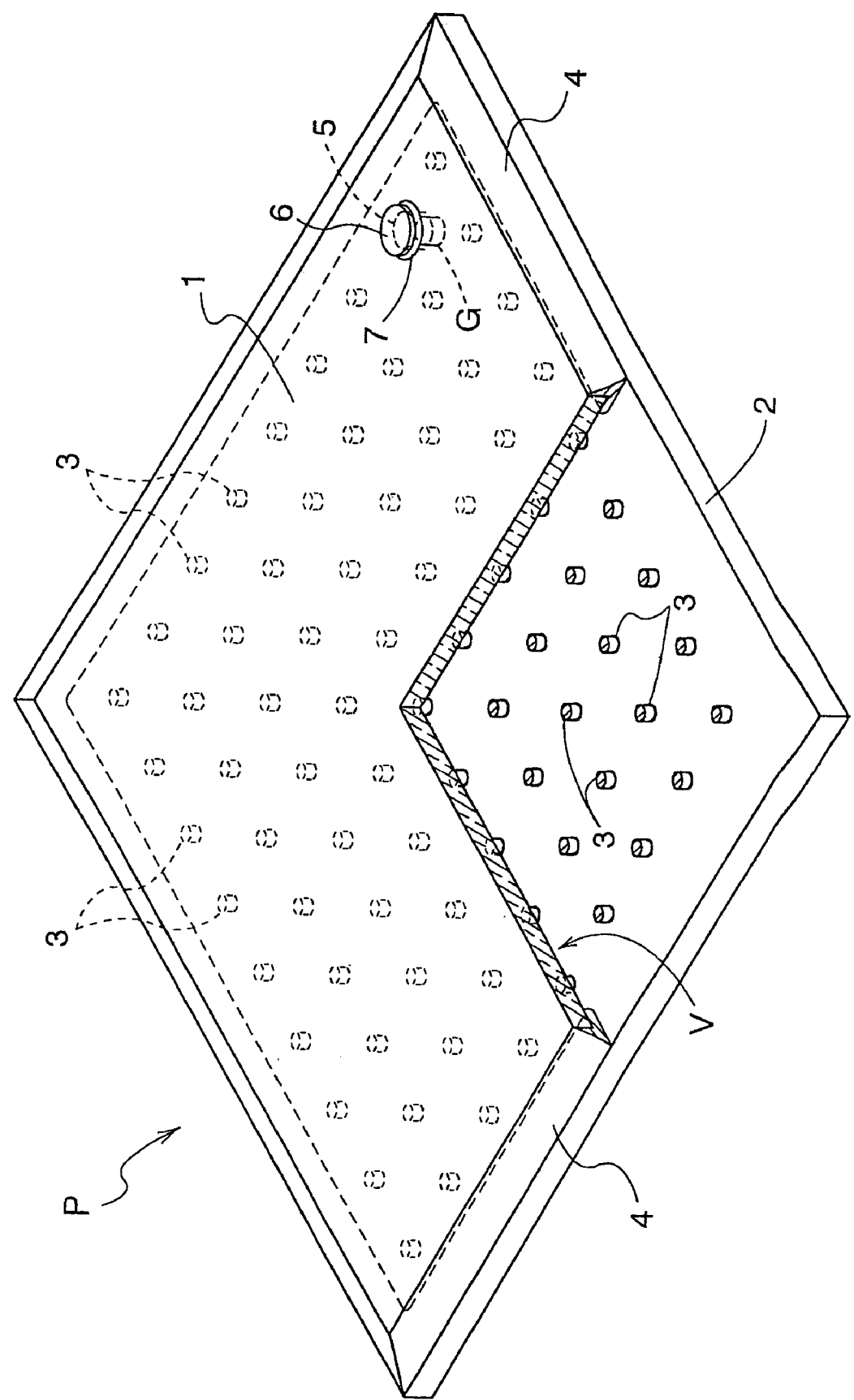
FIG. 1 is a partly cut away perspective view of a vacuum double glazing.

As illustrated in FIG. 1, a vacuum double glazing P comprises a pair of glass plates 1 and 2 and numerous spacers 3 arranged therebetween. Thus, the glass plates 1 and 2 are arranged opposite each other with a void V defined therebetween. Both of the glass plates 1 and 2 are joined at peripheries thereof by a joining seal member 4 in the form of low temperature-melting glass having a lower melting point than the glass plates 1 and 2, and low gas permeability, with the void V between the glass plates 1 and 2 being sealed in a decompressed condition.

Float glass plates in the form of transparent soda lime glass approximately 2.65 to 3.2 mm thick are used as the glass plates 1 and 2. The void V defined between the glass plates 1 and 2 is decompressed to 1.33 Pa ($1.0\times10^{-2}$ Torr) or less.

Figure 2:
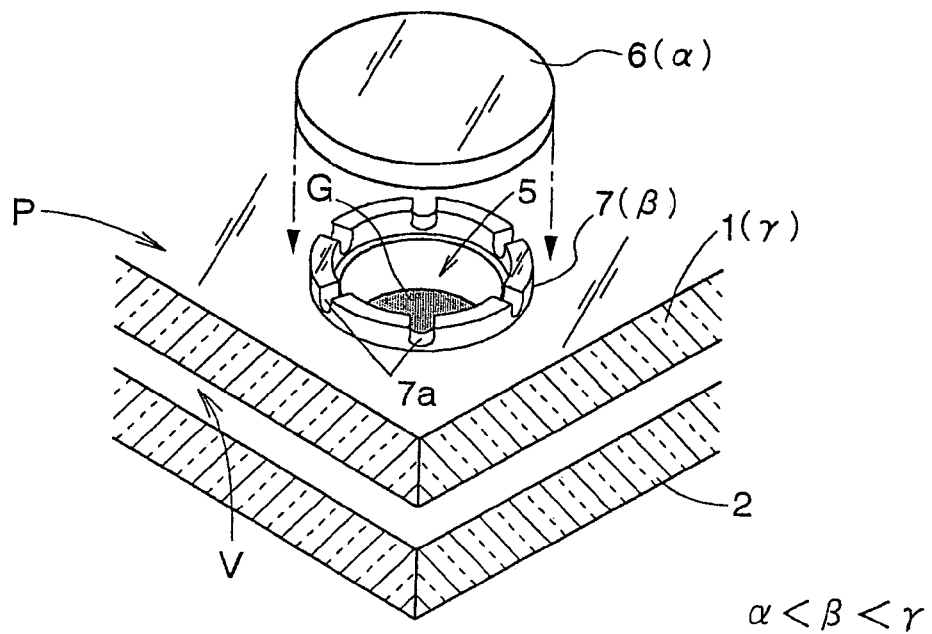
FIG. 2 a perspective view of a principal portion of the vacuum double glazing showing a manufacturing process thereof.
Figure 3:
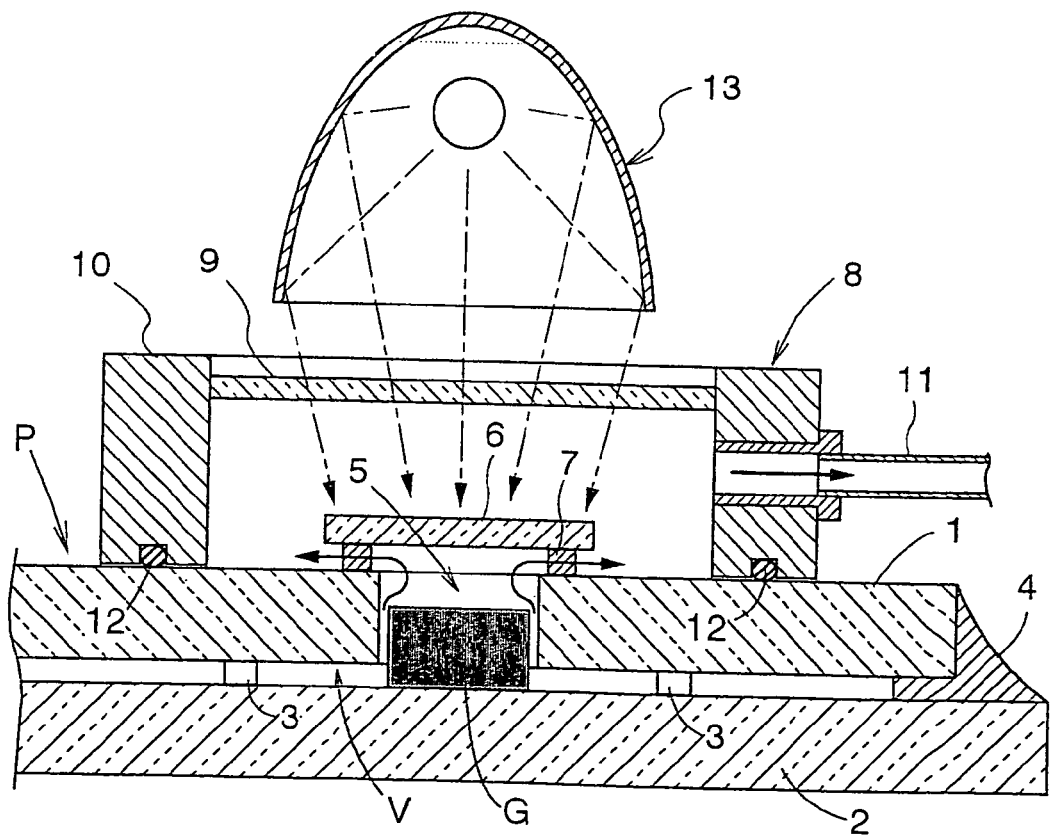
FIG. 3 is a sectional view of the vacuum double glazing and a suction sealing device in the manufacturing process.

A decompression process for the void V will be described in detail later. As illustrated in FIGS. 2 and 3, one of the glass plates 1 has a suction bore 5 formed therein and having a circular section which is one example of communicating bores to communicate with the void V in order to decompress the void V by drawing and removing gas therefrom. The suction bore 5 acts also as a getter accommodating space for accommodating a cylindrical getter G. The suction bore 5 accommodates the getter G, and the suction bore 5 is sealed by a circular lid member 6 made of transparent flat glass rigidly adhered to the bored glass plate 1 having the suction bore 5 by a thermally meltable seal member 7.

As the lid member 6 for sealing the suction bore 5, borosilicate glass is used having a thermal expansion coefficient $\alpha$ smaller than a thermal expansion coefficient $\gamma$ of the soda lime glass used as the bored glass plate 1. The lid member 6 is rigidly adhered to the bored glass plate 1 by the thermally meltable seal member 7 made of low temperature-melting glass having a higher melting point than the low temperature-melting glass forming the joining seal member 4, and having a lower melting point than the lid member 6 and the bored glass plate 1.

As the thermally meltable seal member 7, low temperature melting glass is selected having a thermal expansion coefficient $\beta$ smaller than the thermal expansion coefficient $\gamma$ of the bored glass plate 1 and greater than the thermal expansion coefficient $\alpha$ of the lid member 6, where a relationship $\alpha<\beta<\gamma$ is established between the thermal expansion coefficient $\alpha$ of the lid member 6, the thermal expansion coefficient $\beta$ of the thermally meltable seal member 7 and the thermal expansion coefficient $\gamma$ of the bored glass plate 1.

The lid member 6 is approximately 20 mm in diameter where the suction bore 5 12 mm in diameter accommodates the getter 10 mm in diameter, for example.

The spacers 3 preferably have a cylindrical configuration. They are made of a material having a compressive strength of at least $4.9\times10^8$ Pa ($5\times10^3$ kgf/cm$^2$), e.g. stainless steel (SUS304), Inconel 718 or the like, to be capable of enduring atmospheric pressure acting on both of the glass plates 1 and 2. In the case of the cylindrical configuration, the spacers 3 are about 0.3 to 1.0 mm in diameter and about 0.15 to 1.0 mm in height. The intervals between the spacers 3 are set to about 20 mm.

Next, a process for manufacturing the vacuum double glazing P will be described.

First, one of the glass plates 2 not having the suction bore 5 formed therein is supported in a substantially horizontal position. The joining seal member 4 made of paste-like low temperature-melting glass is applied to a top surface of the glass plate at the peripheries thereof, and the numerous spacers 3 are arranged at predetermined intervals. Then, the bored glass plate 1 is placed over the spacers. In this arrangement, the lower glass plate 2 has a slightly larger area such that the peripheries of the lower glass plate may protrude from the peripheries of the upper bored glass plate 1. This is convenient for application of the joining seal member 4.

The glass plates 1 and 2 in a substantially horizontal position are placed in an unillustrated heating furnace. The joining seal member 4 is melted by baking to execute a joining process for joining the glass plates 1 and 2 at the peripheries thereof by the melted joining seal member 4 to seal the void V.

Then, as shown in FIG. 2, the getter G is inserted into the suction bore 5 of the bored glass plate 1. Around the suction bore 5 of the bored glass plate 1 is placed the annular thermally meltable seal member 7, and the lid member 6 is placed on the thermally meltable seal member 7. A plurality of suction recesses 7a are formed peripherally of the thermally meltable seal member 7. Gas can be drawn and removed from the void V through the suction recesses 7a. With this arrangement, a suction sealing device 8 is placed from above as shown in FIG. 3.

The suction sealing device 8 includes a tubular suction cup 10 closed by transparent silica glass 9 at a top thereof. The suction cup 10 includes a flexible suction pipe 11 communicating with an interior space of the suction cup 10, and an O-ring 12 provided in a lower surface thereof for sealing the top surface of the bored glass plate 1. A heat source 13 in the form of a lamp, laser-beam generator or the like is provided on an outer upper surface of the silica glass 9 of the suction cup 10.

While the void V is gradually heated with the bored glass plate 1 being covered with the suction sealing device 8, the interior of the suction cup 10 is decompressed by using an unillustrated rotary pump or a turbo molecular pump connected to the flexible pipe 11 thereby to execute a baking process for drawing and removing gas from the void V through the suction bore 5 and further decompress the interior of the void V to 1.33 Pa or less.

During the decompressing process, the thermally meltable seal member 7 is locally heated by the heat source 13 to 400° C. or above, for example, to be melted thereby to adhere the lid member 6 to the bored glass plate 1.

At about the time the void V is decompressed to a predetermined pressure, the getter G is also heated and activated. Then, water and gases such as CO, $CO_2$, $N_2$, $H_2$, $O_2$, namely various gases such as oxide gas, sulfide gas, carbide gas and organic gas that have not been drawn in the baking process are adsorbed and removed.

The entire lid member 6 is also heated to approximately 400° C. as the thermally meltable seal member 7 is heated and melted. In the bored glass plate 1, the vicinity of the suction bore 5 is heated to approximately 400° C., while the peripheral portions remote from the suction bore 5 are heated to approximately 180° C.

Figure 4:
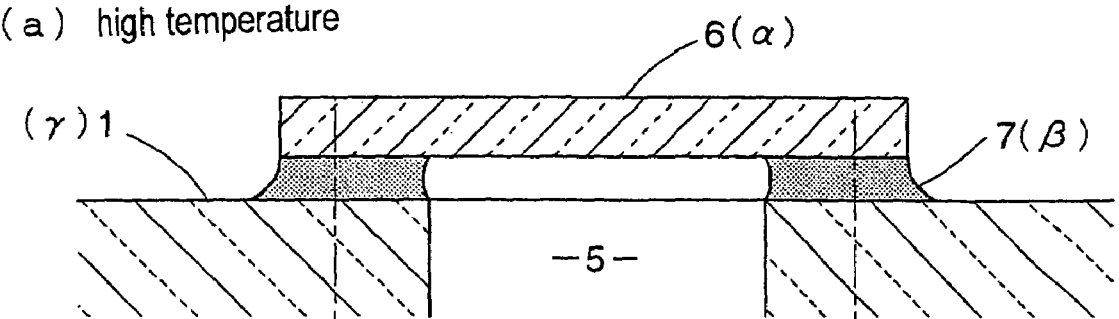
FIG. 4 is an explanatory view showing operation of the vacuum double glazing.
Figure 4:
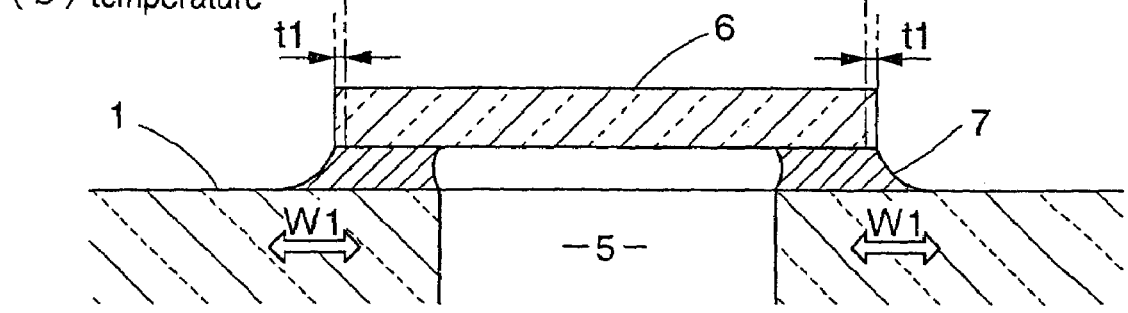
Figure 5:
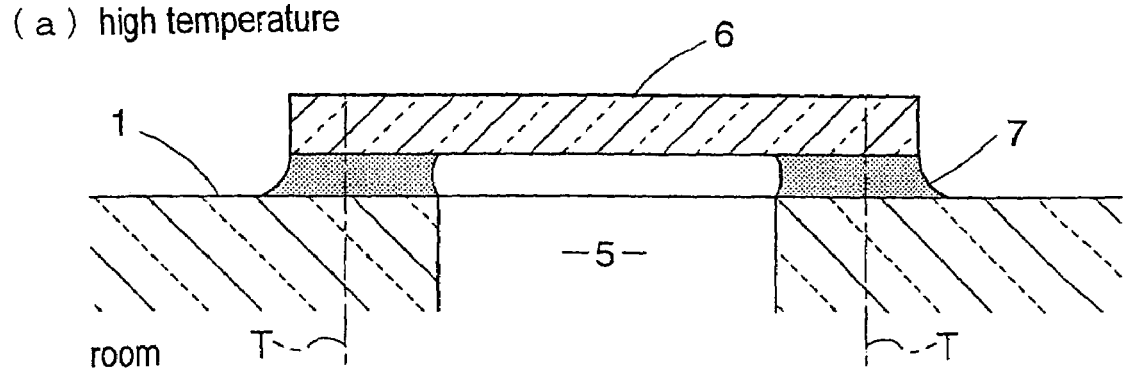
FIG. 5 is an explanatory view showing operation of a conventional vacuum double glazing.
Figure 5:
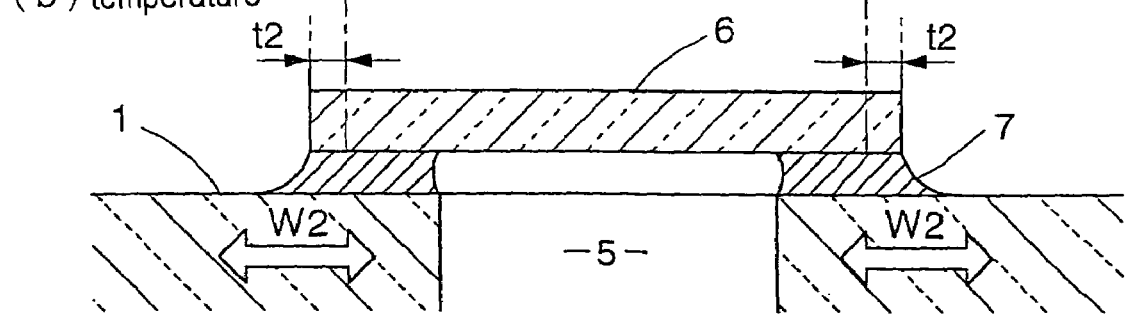

At this time, as shown in FIG. 4(*a*), the lid member 6 thermally expands relative to a room temperature position indicated as T by an amount corresponding to the heating temperature. The vicinity of the suction bore 5 in the bored glass plate 1 is restrained by the peripheral portions thereof and thus not allowed to thermally expand by an amount corresponding to the heating temperature. However, since the relationship $\alpha<\gamma$ is established between the thermal expansion coefficient $\alpha$ of the lid member 6 and the thermal expansion coefficient $\gamma$ of the bored glass plate 1, the amounts of thermal expansion of the lid member 6 and the vicinity of the suction bore 5 in the bored glass plate 1 approximate each other.

Thus, even when the lid member 6 is adhered to the bored glass plate 1 by hardening of the melted thermally meltable seal member 7 and further cooled to room temperature to thermally contract, the amounts of thermal contraction of the lid member 6 and the vicinity of the suction bore 5 in the bored glass plate 1 approximate each other. For example, the lid member 6 is restrained from thermally contracting only by an amount indicated by t1 in FIG. 4(*b*). As a result, tensile stress W1 generated in the bored glass plate 1 becomes relatively small.

OTHER EMBODIMENTS (1) In the foregoing embodiment, the vacuum double glazing P is shown as one example of glass panel. The present invention may be applied also to a plasma display panel or the like in which the void V defined between the glass plates 1 and 2 is filled with gas. In such a case, the void V is filled with a predetermined gas after the baking process is executed.

Where the present invention is applied to the vacuum double glazing P, the vacuum double glazing P comprises the pair of float glass plates 1 and 2 as described above, but a material may be selected as appropriate for various use and purposes of the glass grazing P. For example, it is possible to use, alone or in combination, figured glass, obscured glass having a light diffusing function obtained by a surface treatment, net glass, wire glass, tempered glass, heat-strengthened glass, low-reflecting glass, high-penetrable sheet glass, ceramic print glass, or special glass having a heat-absorbing or ultraviolet-absorbing function.

Further, in the foregoing embodiment, the pair of glass plates 1 and 2 are made of soda lime glass while the lid member 6 is made of borosilicate glass. With regard to glass compositions for the lid member 6 and glass plates 1 and 2, an appropriate selection may be made from among soda silica glass, borosilicate glass, aluminosilicate glass, and various types of crystallized glass as long as the relationship $\alpha<\gamma$ is established between the thermal expansion coefficient $\alpha$ of the lid member 6 and the thermal expansion coefficient $\gamma$ of the glass plates 1 and 2. The lid member 6 is also not limited to glass, but may be formed of various materials such as metal, ceramics or the like.

In the foregoing embodiment, the getter G is accommodated in the suction bore 5 sealed by the lid member 6. However, the getter G is dispensable since it is sometimes not required depending on the degree of decompression in the void V of the vacuum glass P.

(2) In the foregoing embodiment, the low temperature-melting glass is used as the thermally meltable seal member 7 for adhering the lid member 6 to the bored glass plate 1. Instead of the low temperature-melting glass, metal melting solder may be used. Similarly, metal melting solder may be used as the joining seal member 4 for joining the pair of glass plates 1 and 2 at the peripheries thereof.

INDUSTRIAL UTILITY

The present invention provides a glass panel capable of restraining cracks and breaks from generating in a bored glass plate when a lid member is adhered to the bored glass plate by a thermally meltable seal member.

The invention claimed is:

1. A glass panel comprising a pair of glass plates opposed to each other with a void defined therebetween, a joining seal member for joining and sealing the glass plates at peripheries thereof, a communicating bore formed in one of the glass plates for communicating with the void, a lid member and a thermally meltable seal member for sealing the lid member to the communicating bore, wherein the lid member is made of a material having a thermal expansion coefficient smaller than a thermal expansion coefficient of the bored glass plate, and wherein the thermally meltable seal member is made of a material having a thermal expansion coefficient smaller than the thermal expansion coefficient of the bored glass plate and greater than the thermal expansion coefficient of the lid member.

2. A glass panel of claim 1, wherein the void is decompressed.

3. A glass panel of claim 1, wherein the lid member is made of glass, and the thermally meltable seal member is made of low temperature-melting glass.

4. A glass panel of claim 3, wherein the void is decompressed.

* * * * *